Figures 1, 2:
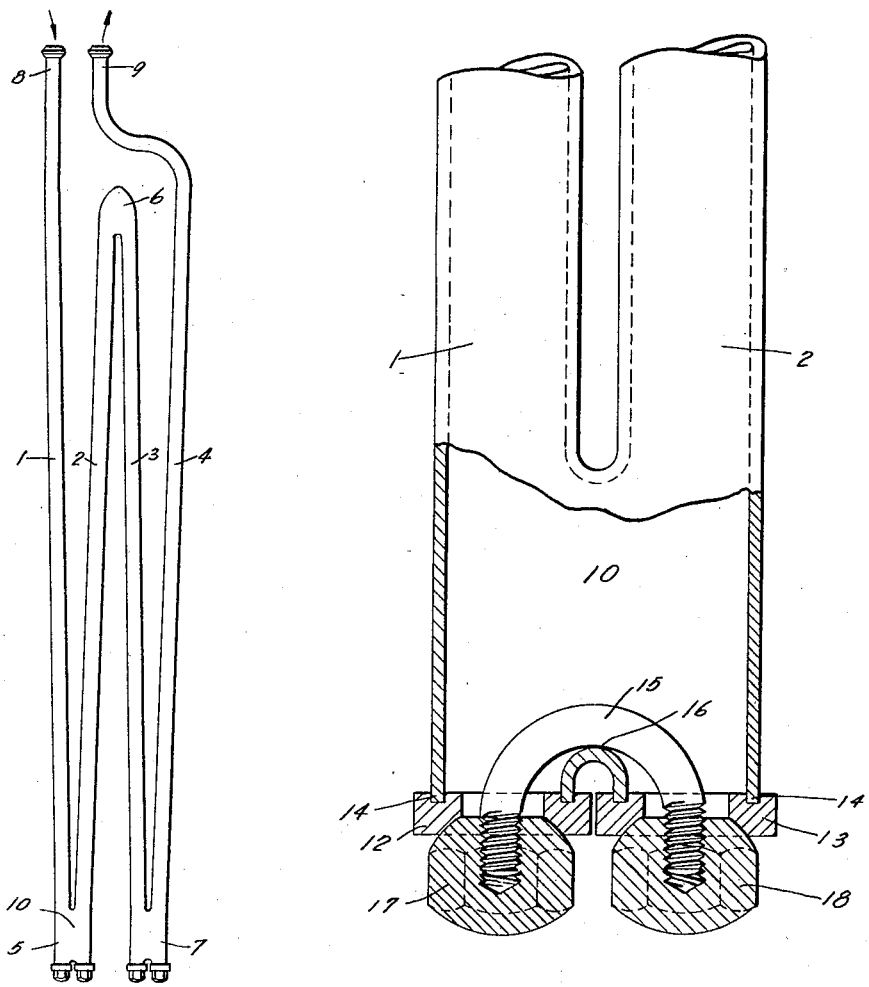

C. H. TRUE.
RETURN BEND.
APPLICATION FILED APR. 14, 1920.

1,384,581.

Patented July 12, 1921.

CHARLES H. TRUE Inventor

By HIS Attorney O. V. Thiele

UNITED STATES PATENT OFFICE.

CHARLES HENDERSON TRUE, OF HAMMOND, INDIANA, ASSIGNOR TO THE SUPER-HEATER COMPANY, OF NEW YORK, N. Y., A CORPORATION OF DELAWARE.

RETURN-BEND.

1,384,581.     Specification of Letters Patent.     Patented July 12, 1921.

Application filed April 14, 1920. Serial No. 373,905.

*To all whom it may concern:*

Be it known that I, CHARLES H. TRUE, a citizen of the United States, residing at Hammond, in the county of Lake and State of Indiana, have invented certain new and useful Improvements in Return-Bends, of which the following is a specification.

This invention relates to return bends. In structures of this class it is desirable, under certain conditions, to make the interior accessible, the openings for this purpose being in line with the two pipes connected by the return bend so that cleaning tools may be inserted through the openings and into the pipes.

The object of my invention is to provide an improved form of return bends embodying this feature.

The invention is illustrated in the single sheet of drawings accompanying this specification. In this drawing Figure 1 shows a unit or element such as is used particularly in connection with super-heaters, this element having my invention applied to it; Fig. 2 shows on an enlarged scale and partly in section a portion of the element illustrated in Fig. 1.

It will be seen in Fig. 1 that there are four pipe lengths 1, 2, 3 and 4,—1 and 2 being connected by the return bend 5; 2 and 3 by the return bend 6, and 3 and 4 by the return bend 7. The ends 8 and 9 are to be connected to a source of supply and a take-off respectively. Of the three return bends the one numbered 6 is shown as being of an ordinary forged type, while 5 and 7 are of my improved form. The two return bends 5 and 7 are identical and only one will be described. Let it be the one at the lower ends of pipes 1 and 2. The two pipes, as is clearly shown in the drawing, are connected at a comparatively short distance from their ends by the short transverse channel 10. The ends of the pipes 1 and 2 are closed by the two circular gaskets or washers 12 and 13 respectively, which may be made of metal or other desired material. In the form illustrated they are shown to be recessed at 14, the ends of the pipes extending into these recesses. A U-shaped bolt 15 threaded at each end bears against the wall of channel 10 at point 16, the two ends extending out centrally through the openings of the pipes 1 and 2. Screwed on the threaded ends are the two special nuts 17 and 18. These nuts engage the gaskets or washers 12 and 13, forcing them against the edges of the pipes. The joint between the nuts and the gaskets is shown in the drawing as being a ball and socket joint.

When the return bend is to be opened the two nuts 17 and 18 must be removed; the gaskets 12 and 13 taken off, after which the U-shaped bolt can be taken out.

From the above the invention will be readily understood. The spirit of it can evidently be embodied in a structure which is not exactly like the one just described in detail. It is evidently not necessary, for example, that the bolt be of a smooth curvature or that gaskets of the exact shape shown be used. In fact in some cases the gaskets may be dispensed with entirely. These and similar variations will readily occur to the skilled workmen in practice.

What I claim is:—

1. In a structure of the class described, the combination of two parallel pipes; a channel connecting them at a comparatively small distance from their ends, the walls of the channel being integral with the pipes; a U-shaped bolt with threaded ends whose parallel legs extend through the open ends of the pipes and which bears against the channel wall nearest the pipe ends; closures for the pipe ends; and means engaging the threaded ends of the bolt and the closures to force the latter against the pipe ends.

2. In a structure of the class described, the combination of two parallel pipes, a channel connecting them at a comparatively small distance from their ends, the walls of the channel being integral with the pipes; a closure for each pipe end; and means extending through the channel and the closures and engaging the channel wall and the closures, to hold the closures to the pipe ends.

CHARLES HENDERSON TRUE.